United States Patent [19]

Gandhi

[11] Patent Number: 5,701,501
[45] Date of Patent: Dec. 23, 1997

[54] APPARATUS AND METHOD FOR EXECUTING AN ATOMIC INSTRUCTION

[75] Inventor: Jayanti L. Gandhi, Tempe, Ariz.

[73] Assignee: Intel Corporation, Santa Clara, Calif.

[21] Appl. No.: 23,693

[22] Filed: Feb. 26, 1993

[51] Int. Cl.$^6$ .................................................. G06F 9/00
[52] U.S. Cl. .................. 395/800; 395/740; 395/735; 395/379; 395/482
[58] Field of Search .................. 395/378, 725, 395/800, 740, 735, 379, 482

[56] References Cited

U.S. PATENT DOCUMENTS

| | | | |
|---|---|---|---|
| 4,218,739 | 8/1980 | Negi et al. | 395/735 |
| 4,503,495 | 3/1985 | Boudreau | 395/729 |
| 5,148,544 | 9/1992 | Cutler et al. | 395/734 |
| 5,175,829 | 12/1992 | Stumpf et al. | 395/379 |
| 5,218,712 | 6/1993 | Cutler et al. | 395/800 |
| 5,274,823 | 12/1993 | Brinner et al. | 395/726 |
| 5,363,506 | 11/1994 | Fukuoka | 395/740 |

OTHER PUBLICATIONS

Sowell, Programming in Assembly Language: Macro–11, ©1984, Addison–Wesley Pub. Co. pp. 174–176, 313–326.
Intel i960™ CA Microprocessor User's Manual, pp. 12–15, Intel 1992.

*Primary Examiner*—Alyssa H. Bowler
*Assistant Examiner*—John Follansbee
*Attorney, Agent, or Firm*—Blakely, Sokoloff, Taylor & Zafman

[57] ABSTRACT

A simple, but effective method and apparatus for employing the same is utilized to ensure the atomicity of atomic instructions. Two bits which are visible in a register are used. The control bit is read and write accessible. The status bit is read only accessible. The control bit and status bit are coupled such that the state of the status bit is updated with the state of the control bit after a predetermined delay. Therefore, code can be written to utilize the feature to execute an atomic instruction. Execution of the atomic instruction is initiated, the control bit is set and an instruction, such as branch if clear, is executed which causes the processor to wait until the status bit is set before executing subsequent instructions. Therefore, the atomic instruction has sufficient time to complete execution before the status bit is set and subsequent instruction are executed.

12 Claims, 1 Drawing Sheet

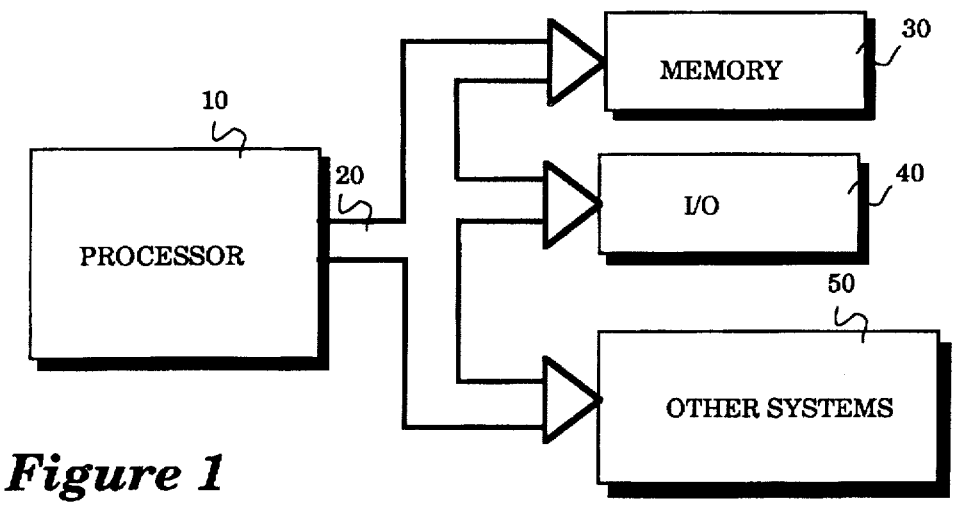
Figure 1
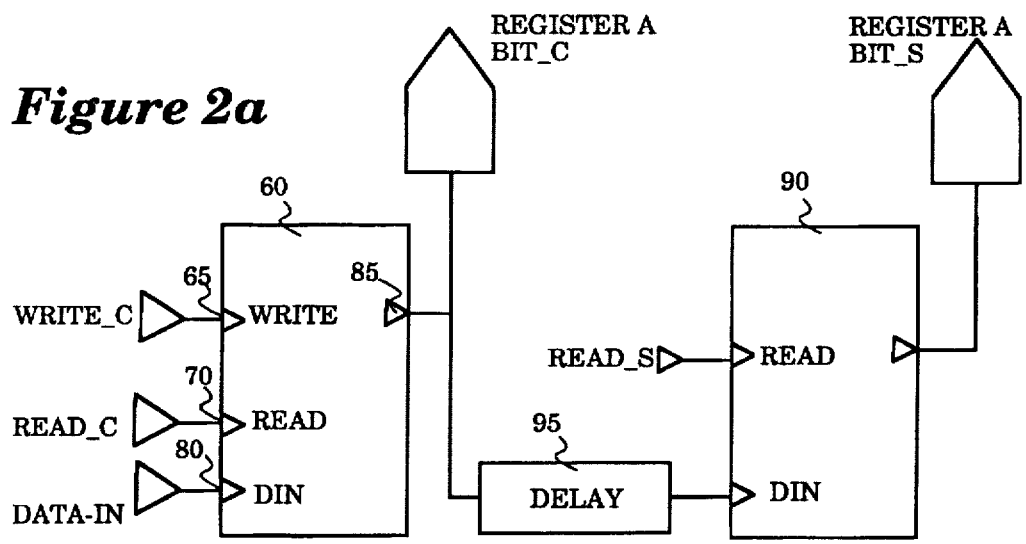
Figure 2a
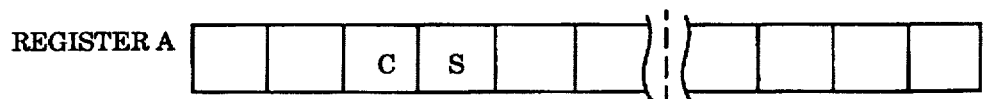
Figure 2b
Figure 3a
```
LOOP1:   SET BIT            BIT_C, REG A
         BRANCH IF CLEAR    BIT_S, REG A, LOOP1
```
Figure 3b
```
         MOV,               REG X, REG Y
LOOP2:   SET BIT            BIT_C, REG A
         BRANCH IF CLEAR    BIT_S, REG A, LOOP2
```

APPARATUS AND METHOD FOR EXECUTING AN ATOMIC INSTRUCTION

BACKGROUND OF THE INVENTION

1. Field of the Invention

The present invention relates to a method and apparatus for executing atomic instructions. More particularly, the present invention relates to a method and apparatus for insuring the atomicity of atomic instructions.

2. Art Background

An atomic instruction is a computer instruction which requires completion of the instruction prior to execution of subsequent instructions. The atomicity of the instruction may be required, for example, because the result of the execution of the atomic instruction is required for execution of the subsequent instructions, or because the atomic instruction requires a maintenance of the state at the time the instruction is initiated. Currently, an atomic operation may be implemented using long routines in microcode or by stalling the pipeline processor until execution of the atomic operation is completed. These approaches have fundamental drawbacks of being inflexible when the need for the addition of a new atomic operation arises because the microcode must be modified or major hardware changes need to be made to accommodate the new atomic operations each time. Furthermore, the microcode change will also be accompanied by the addition of a new instruction and this will require modifications to a well established software tools chain.

In the method and apparatus of the present invention, a simple but effective architecture provides for a fast and flexible software mechanism for executing an atomic operation which is transparent to processor hardware changes. This architecture is adaptable to future performance enhancements and works with varying pipeline stages.

SUMMARY OF THE INVENTION

The present system provides for a simple, but effective, method to ensure the atomicity of instructions using existing hardware. Two bits from a visible register, a control bit and a status bit, are utilized. The control bit is read and write accessible. The status bit is read only, but is updated with the data of the control bit a predetermined number of clock cycles after the control bit is written to. To prevent subsequent instructions from executing prior to the atomic instruction's completion, the control bit is set and the status bit is monitored. Once the status bit is set, subsequent instructions are executed. The delay required between the update of the control bit and the status bit ensures that the atomic instruction completes execution prior to execution of subsequent instructions. Furthermore, as the status bit is read only and is updated only by the control bit, the state of the status bit cannot be modified. Therefore, the atomicity of the instructions are preserved without the performance overhead incurred in prior art systems.

BRIEF DESCRIPTION OF THE DRAWINGS

The objects, features and advantages of the present invention will become apparent to one skilled in the art in view of the following detailed description in which:

FIG. 1 is a simple block diagram of an exemplary computer system.

FIG. 2a is a block diagram illustrating the architecture for implementing an atomic operation and FIG. 2b is illustrative of a register which is visible to the user and contains a control and status bit.

FIG. 3a and 3b are examples of code which implements and atomic operation in accordance with the architecture of the present invention.

DETAILED DESCRIPTION OF THE INVENTION

In the following description for purposes of explanation, numerous details are set forth in order to provide a thorough understanding of the present invention. However, it will be apparent to one skilled in the art that these specific details are not required in order to practice the invention. In other instances, well known electrical structures and circuits are shown in block diagram form in order not to obscure the present invention unnecessarily.

An illustrative computer architecture for implementing an atomic operation is embodied in a computer system such as that shown in FIG. 1. The processor 10 communicates via a bus 20 to a plurality of peripheral devices such as memory 30, input/output devices 40 and other systems and buses 50. Preferably, the architecture for implementing an atomic operation is included in the processor 10 and is controlled by instructions issued and received through the peripheral devices 30, 40 and 50. Exemplary systems and processors are those manufactured by Intel Corporation, Santa Clara, Calif.

A simplified exemplary architecture is shown in FIG. 2a. A first buffer 60 outputs a first status bit referred to as a control status bit which is visible to the user as a bit in a register, referred to herein as "Register A" and illustrated by FIG. 2b. This bit is read and write accessible. The buffer 60 has write line input 65, a read input 70, data in 80 and data out 85. The bit can be manipulated using the read, write and data inputs which, for example, can be controlled by the user reading and writing the control bit visible in Register A. The output 85 of buffer 60, which is the control bit, is further input to a second buffer 90, which subsequently outputs a status bit visible at a user visible register. However, the status bit visible is read only. The status bit is updated only by internal hardware which inputs the control bit, output by buffer 60, to the buffer 90 after a predetermined delay, as controlled by the delay 95. Thus, the state of the status bit, although visible and readable by the user, is not controllable except through the setting of the control bit.

To execute an atomic instruction, the code employing the atomic instruction takes advantage of this structure to ensure the atomicity of the instruction. Examples of instructions are shown in FIGS. 3a and 3b. FIG. 3a can be used, for example, to disable interrupts. As there is latency between the issuance of a disable interrupt instruction and the subsequent execution of the disabling of the interrupt, it is important that this instruction is atomic. To ensure this, the following loop can be instituted. The predetermined bit of a predetermined register is identified as the control bit. For example, in an Intel 960 CA processor, bit 31 of the IMSK register (SF1) may be used. The setting of this bit also initiates the disable instruction to interrupts. The next instruction is a branch if clear (BBC) instruction which checks the status bit to determine if the bit is set or reset. If the bit is clear or reset, the processor branches to the target location identified in the instruction, in this example, Loop 1. In accordance with the architecture shown in FIG. 2a, the set bit command causes a write operation to bit C of the first buffer 60. The output of the buffer 60 is also input to delay 95, which delays the signal for the predetermined amount of time and then inputs the value to the second buffer 90 for the status bit. Thus, referring back to FIG. 3a, a branch if clear instruction referencing the status bit will cause the processor to return to Loop 1 and cycle down through to the branch if clear statement until the status bit is set to 1. Once the status bit is set to 1, the processor proceeds to the next statement containing the next instruction to be executed.

It is apparent that the use of the BBC statement is illustrative and other branch instructions can be used. The resultant effect of the code is that the instructions subsequent to the atomic instruction are delayed a specified period of time to permit the execution of the atomic instruction, thereby insuring the atomicity of the instruction. The amount of time is tailored to the completion of the atomic instruction execution (i.e., associated hardware function such as disabling interrupts) and can be done in a few clock cycles as opposed to the 40 minimum clock cycles found in the prior art. The system can be figured such that all or a part of the atomic instructions reference the same control bit and status bit or different control and status bits may be specified for different types of instructions requiring different amounts of time for execution and therefore varying the amount of the delay 95. Alternately, the delay 95 can be programmable according to the instruction to be used.

Another example of an atomic instruction executed in accordance with the architecture of the present invention is shown in FIG. 3b. FIG. 3b shows a simple move register instruction which, for purposes of illustration, is identified as an atomic instruction. Immediately following the move instruction, a set bit instruction is executed to set the control bit. A branch if clear statement is then executed which monitors the status bit to determine when the status bit is set, thereby permitting execution of subsequent instructions.

The invention has been described in conjunction with the preferred embodiment. It is evident that numerous alternatives, modifications, variations, and uses will be apparent to these skilled in the art in light of the foregoing description.

What is claimed is:

1. A system for executing atomic instructions comprising:
   means for storing a plurality of instructions, comprising at least one atomic instruction;
   processor means for executing instructions comprising;
      means for setting and resetting a control bit in a visible register, which is read and write accessible by the user,
      delay means coupled to the control bit for receiving the value of the control bit and delaying the output of the value of the control bit a predetermined amount of time,
      means for setting and resetting a status bit which is read only accessible to a user in a visible register, said status bit coupled to the output of the delay means to receive the value of the control bit output by the delay means; and
      control means for preventing subsequent instructions to be executed until the status bit is set to a first state;
   wherein the atomic instruction completes execution within the predetermined amount of time and prior to execution of subsequent instructions.

2. The system as set forth in claim 1, wherein said means for setting and resetting a control bit comprises instruction to set the control bit.

3. The system as set forth in claim 1, wherein said control means comprises a branch instruction which branches to subsequent instructions once the status bit is set to the first state.

4. The system as set forth in claim 1, wherein the means for storing a plurality of instructions is external to the processor.

5. The system as set forth in claim 1, wherein the means for storing a plurality of instructions comprises a memory.

6. The system as set forth in claim 1, wherein the control means prevents subsequent instructions to be executed until the status bit is set to a value of one.

7. An apparatus for executing atomic instructions comprising:
   a first buffer, the output of which is visible as a control bit in a register, said buffer being read and write accessible to a user;
   a second buffer, the output of which is visible as a status bit in a register, said buffer being read only accessible to the user;
   a delay means coupled between the output of the first buffer and the input to the second buffer, such that the state of the status bit equals the state of the control bit after the delay;
   a control means for preventing execution of instructions subsequent to the atomic instruction until execution of the atomic instruction is complete comprising setting the control bit to a first state, monitoring the status bit to determine when the status bit is set to the first state and preventing the execution of subsequent instructions until the status bit is set to the first state.

8. The apparatus as set forth in claim 7, wherein said control means comprises code which loops back to a branch statement which tests the status bit until the status bit is set to the first state.

9. The apparatus as set forth in claim 7, wherein the code comprises:

| Loop: | Set bit | Control bit |
|-------|---------|-------------|
|       | branch if clear | status bit | where the set bit command sets the control bit and the branch if clear command branches back to location "LOOP" until the status bit is set.

10. The apparatus as set forth in claim 7, wherein the first state is a value of one.

11. A method for executing an atomic instruction comprising the steps of:
   retrieving a plurality of instructions comprising at least one atomic instruction;
   when an atomic instruction is to be executed;
      setting a control bit in a visible register to a first state, said control bit being read and write accessible,
      coupling the control bit value,
      coupling the control bit to a status bit in a visible register through a delay means having a predetermined delay such that the status bit is updated with the value of the control bit after the predetermined delay, said status bit being read accessible by a user, maintaining the state of the status bit and preventing execution of subsequent instructions until the status bit is set to the first state.

12. The method as set forth in claim 11, wherein the first state is a value of one.

* * * * *